(12) United States Patent
Lowery

(10) Patent No.: US 9,452,888 B2
(45) Date of Patent: Sep. 27, 2016

(54) HIGH VOLUME LOADING AND STACKING APPARATUS AND METHOD

(71) Applicant: Sterling Wayne Lowery, Glen Allen, VA (US)

(72) Inventor: Sterling Wayne Lowery, Glen Allen, VA (US)

( * ) Notice: Subject to any disclaimer, the term of this patent is extended or adjusted under 35 U.S.C. 154(b) by 0 days.

(21) Appl. No.: 14/634,741

(22) Filed: Feb. 28, 2015

(65) Prior Publication Data

US 2015/0175363 A1    Jun. 25, 2015

Related U.S. Application Data

(63) Continuation-in-part of application No. 13/770,303, filed on Feb. 19, 2013, now Pat. No. 8,967,363.

(51) Int. Cl.

| | |
|---|---|
| B65G 65/02 | (2006.01) |
| B65G 65/08 | (2006.01) |
| B65G 65/10 | (2006.01) |
| B65G 23/24 | (2006.01) |
| B02C 1/00 | (2006.01) |
| E02F 3/32 | (2006.01) |
| E02F 7/02 | (2006.01) |
| B65G 41/00 | (2006.01) |

(52) U.S. Cl.
CPC ................. *B65G 23/24* (2013.01); *B02C 1/00* (2013.01); *B65G 41/008* (2013.01); *E02F 3/32* (2013.01); *E02F 7/026* (2013.01)

(58) Field of Classification Search
CPC .............................. B65G 65/02; B65G 65/08
USPC ............. 198/311, 312, 314, 510.1, 512, 514, 198/517, 519, 617
See application file for complete search history.

(56) References Cited

U.S. PATENT DOCUMENTS

| | | | |
|---|---|---|---|
| 3,680,920 A * | 8/1972 | Amoroso | E21D 9/128 198/514 |
| 4,184,581 A | 1/1980 | Crawshay et al. | |
| 4,228,890 A * | 10/1980 | Tothfalusi | E21D 9/128 198/514 |
| 4,296,856 A * | 10/1981 | Freed, Jr. | E21D 9/128 198/514 |
| 4,379,672 A | 4/1983 | Hunter | |
| 4,605,119 A * | 8/1986 | Keuschnigg | E21D 9/128 198/514 |
| 4,641,888 A * | 2/1987 | LeBegue | E21D 9/128 198/514 |
| 4,702,524 A | 10/1987 | Mork et al. | |
| 4,714,154 A * | 12/1987 | Harhoff | B65G 65/12 198/514 |
| 4,858,347 A | 8/1989 | Hanson et al. | |
| 5,123,520 A * | 6/1992 | Schmid | B65G 65/12 198/514 |
| 5,590,754 A | 1/1997 | Lowery | |
| 8,967,363 B2 * | 3/2015 | Lowery | E02F 7/026 198/314 |

* cited by examiner

*Primary Examiner* — Douglas Hess

(57) ABSTRACT

A loading apparatus and method including a stacker conveyor having paired crawler tracks, an inclined conveyor, and an intake end and a discharge end. A wide apron is positioned at the intake end of the conveyor. The apron includes a left-hand side and right-hand side load receiving area that are arranged on opposing sides of the feeder conveyor. Two double hinged feeder blades are positioned at a rear edge of the apron. The feeder blades are arranged to operate asynchronously. Each feeder blade includes a main blade and a wing blade. A straight mechanical drive unit including an engine and two planetary gearboxes that generate the torque required to drive the conveyor. The drive unit includes a torque converter and two planetary gearboxes with planetary sprockets. A chain extends between each planetary sprocket and a corresponding head shaft sprocket on a main head shaft which drives the conveyor.

17 Claims, 16 Drawing Sheets

HIGH VOLUME LOADING AND STACKING APPARATUS AND METHOD

This application is a Continuation-In-Part of U.S. patent application Ser. No. 13/770,303, which was filed on Feb. 19, 2013 and entitled "High Volume Excavating and Loading Apparatus and Method".

FIELD OF THE INVENTION

This invention relates to mining machinery and more specifically to an apparatus and method for high volume excavating and loading of ores.

BACKGROUND OF THE INVENTION

One of the most common arrangements for moving large quantities of heavy material such as overburden from strip mining operations, earth from excavation operations, and other similar material movement, is to use large electric or hydraulic excavators to lift the material into large trucks. Hydraulic excavators come with either front shovel boom arrangements or backhoe booms.

Large electric and hydraulic excavators are typically on crawler tracks and have a large volume bucket that is at the end of a boom and is commonly rated by the cubic yards of material that it will hold. The capacity of most large electric shovels is typically in the range of 70 to 80 cubic yards, commonly quoted as 70 to 80 yards. The capacity of hydraulic excavators is typically in the range of 45 to 50 cubic yards.

Once the operator moves the shovel to the desired area, the boom is swung toward the pile and the bucket is pushed through the pile until it is full of material. In order to maximize the operating time of the shovel, several trucks are used. Trucks typically line up on either side of the large shovel so that, after a truck on one side is loaded, the shovel operator swings to the opposite side to continue operating. A line of trucks is typically formed on each side of the shovel in order to maximize productivity of the shovel and avoid shutting down the loading operation. Operating in this manner, a large electrical shovel with a 70 yard bucket can typically load about 14,000 tons of earth per hour.

Although this production rate is impressive, the efficiency of the shovel is limited by the dead time that occurs with each loading cycle of a truck. A loading cycle includes the time it takes for the operator to drive the bucket through the pile, swing the loaded bucket from the pile while raising it above the truck, then release the load into the truck. The typical cycle time on large shovels is typically around 35 seconds. The truck is therefore sitting idle for much of the time while the operator runs through his loading cycle and this reduces the efficiency of the operation. With the high cost of fuel and the enactment of legislation reducing carbon emissions of trucks, the costs of operating large electric or hydraulic shovels is very expensive. The cost of a large electric shovel is also very expensive, typically in the range of $30 million for a 70 yard shovel.

U.S. patent application Ser. No. 13/770,303, filed on Feb. 19, 2013 and commonly owned with the present invention, was directed to a high volume excavating and loading apparatus for reducing the unproductive time and improving the operating efficiency over conventional large electric and hydraulic excavators.

Although the high volume excavating and loading apparatus of U.S. patent application Ser. No. 13/770,303 provided advantages in productivity and efficiency over conventional large electric and hydraulic excavators, there remains a need to improve the productivity and efficiency in moving large quantities of heavy material to a waiting transport vehicle such as a truck while reducing the cost of the equipment for performing this operation.

SUMMARY OF THE INVENTION

The present invention is directed to a highly productive and efficient loading apparatus and method. The loading apparatus includes a maneuverable stacker conveyor for moving ore or similar material and discharging the material to a truck or similar vehicle. The stacker conveyor includes paired crawler tracks and a frame supporting an inclined conveyor including a having an intake end and a discharge end. A wide apron is positioned at the intake end of the conveyor and the discharge end of the conveyor is elevated with respect to the intake end. The apron includes a left-hand side and right-hand side load receiving area that are arranged on opposing sides of the intake end of the conveyor. Two double-hinged feeder blades are positioned at the sides of the apron. The feeder blades are arranged to operate asynchronously. Each feeder blade includes a main blade and a wing blade to enable a complete sweep of the material on each pass of the blade respective side of the apron. The stacker conveyor is on paired crawler tracks and includes an intake end and a discharge end. An earth mover, such as a bull dozer, is used to push ore onto the apron. The feeder blades operate asynchronously to feed material from one side of the apron onto the conveyor and then the opposing side of the apron onto the conveyor. The feeder blades cycle continuously and the conveyor runs continuously to alternately clear each side of the apron of material and advance the material onto the moving conveyor. The conveyor runs continuously and delivers the loaded material to the discharge chute which delivers the material to a waiting truck, similar haulage vehicle, or feeder-breaker to be crushed and fed onto an overland conveyor. The loading apparatus continues to load in this manner, with the double-hinged feeder blades operating asynchronously, wherein a first side of the apron is loaded by the dozer while the opposing side is deactivated after which the first side feeder blades are deactivated and the second side feeder blades are activated. In this manner, asynchronous operation of the feeder blades continuously delivers material to the conveyor whereupon the conveyor continuously delivers material to waiting haulage vehicle.

OBJECTS AND ADVANTAGES

A first object of the invention is to provide a loading and stacking apparatus that does not require an excavator to pull ore to the machine. The stacking and loading apparatus of the current invention utilizes a conventional dozer to charge the machine, with the dozer pushing material to the apron and the stacker conveyor continuously transporting the material from the apron to a truck or similar vehicle.

A second object of the invention is to eliminate the need for a feed conveyor. The stacker conveyor of the present invention uses only one conveyor to transport and convey material from the intake end to the discharge end.

A further object is to utilized double-hinged feeder blades, including a main blade and a wing blade, to continuously feed material from the apron to a waiting truck or similar vehicle. After the dozer pushes material onto the receiving area, the blades close staggered to completely clear the front apron of each pass.

A further object is to provide a loading and stacking apparatus that can be electronically controlled, thereby eliminating the operator. The truck operator activates the operation of the stacker conveyor and monitors the loaded weight via the on-board scale of the truck, and shuts down the stacker conveyor when the desired weight is achieved. The blades are then actuated automatically after the dozer has backed off—by electric eye sensors—the blades speed then controlled to feed material unto the conveyor evenly— also by electric eyes sensing material depth and controlling blade closure speeds—and start-up and stopping.

A further object of the invention is to eliminate the need for an operator to control a boom and bucket—reaching out and pulling material down to the receiving area.

A further object is provide a conveyor that will hold about a third of a truck load and a front receiving area holding about another third, thereby requiring a dozer to place the another third of a truck load onto front receiving area once it is emptied (about 25 second cycle)—to fully load a truck with 3 passes.

A further object is to provide a stacker conveyor in which the main-head shaft is driven with a bull-dozer, straight mechanical drive unit, using gear reduction in transmission and planetary gear drives to generate the torque required. This dramatically reduces the power requirement and the initial equipment cost as the hydraulic motors, pumps, and radial piston gear-boxes commonly used for this application. As compared to a conventional diesel/electric drive unit, the straight mechanical drive unit of the current invention requires only half the horsepower to generate the same start-up torque.

A further object is to provide a large volume loading apparatus that can be produced at a substantially lower cost than conventional electric shovels. A conventional electric shovel typically costs about $30 million. The loading and stacking apparatus of the present invention would cost about half of the cost of a typical electric shovel.

Another object is to provide a loading apparatus that will load at a higher rate than conventional electric shovels. The loading apparatus of the present invention is capable of loading at a rate of 16,000 tons per hour versus a rate of 14,000 tons per hour for a conventional electric shovel with a 70 cubic yard bucket.

A further object is to provide a high volume loading apparatus that is much smaller than conventional electric shovels. As a result of the continuous loading and conveying of the mined material from the front apron of the excavator to the truck bed, the cycle time is substantially lower than the cycle time of a typical electric shovel. This is a result of eliminating the need to swing the boom from the pile to the truck, dump the bucket contents, and then swing the boom back into the digging position. The loading apparatus of the present invention is operated continuously, and there is no need to swing the load back to the truck as the double hinged feeder blades operate alternately to push mined material from the apron to the conveyor and on to the discharge chute to convey the load to the truck or feeder-breaker.

These and other objects and advantages of the present invention will be better understood by reading the following description along with reference to the drawings.

DETAILED DESCRIPTION OF THE INVENTION

Figure 1:
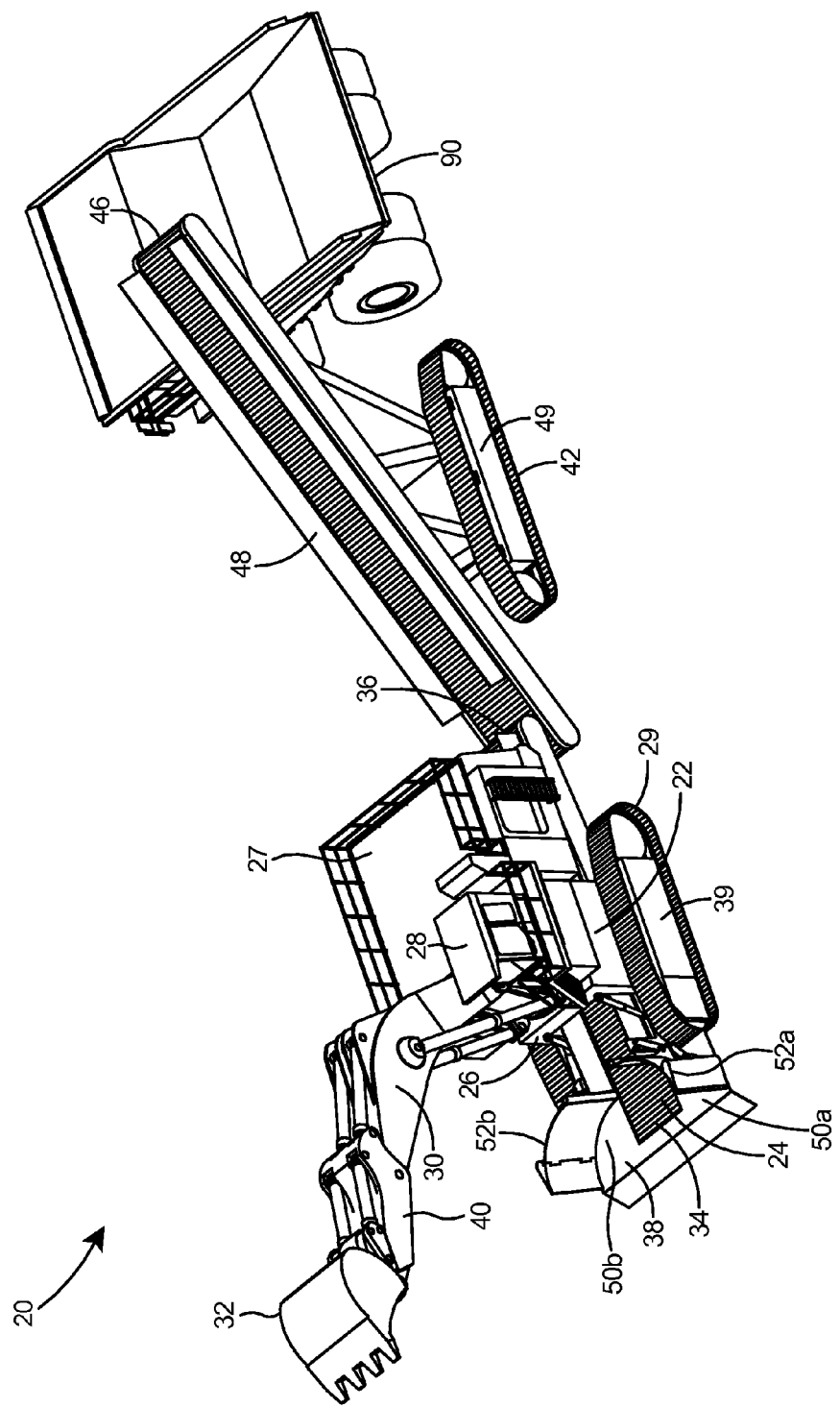
FIG. 1 is a perspective view of the first embodiment of an excavating and loading apparatus according to the present invention.

With reference to FIG. 1 there is shown the first embodiment of an excavating and loading apparatus 20 according to the present invention. The excavating and loading apparatus 20 includes an excavator 22, a feeder conveyor 24, and a stacker conveyor 25. The excavator 22 includes a front end 26, an upper stage 27 that includes a control station 28, paired crawler tracks 29, and an articulated boom 30 with a bucket 32. The feeder conveyor 24 is pinned beneath the upper stage 27 and includes an intake end 34 and a discharge end 36. A wide apron 38 is positioned at the intake end 34 of the feeder conveyor 24. The paired crawler tracks 29 of the excavator are supported by a crawler frame 39.

Figure 2:
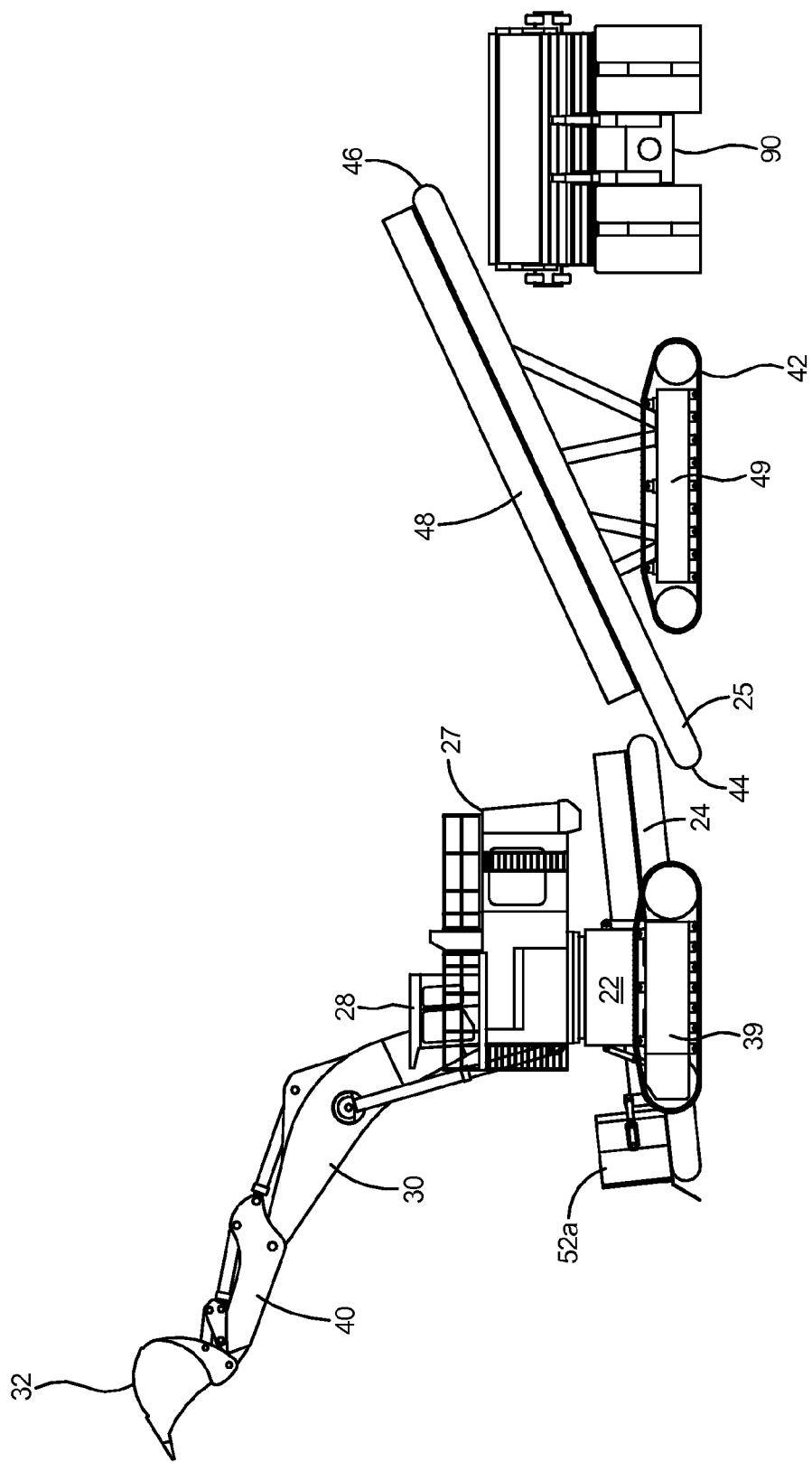
FIG. 2 is a side elevation view of the excavating and loading apparatus of FIG. 1.

Referring to FIG. 2, the excavator 22 is connected to bucket 32 by articulated boom 30 and stick 40. The stacker conveyor 25 is on paired crawler tracks 42 and includes an intake end 44, a discharge end 46, and side walls 48 for containing material on the stacker conveyor. The paired crawler tracks 42 of the stacker conveyor 25 are supported by a crawler frame 49.

Figure 3:
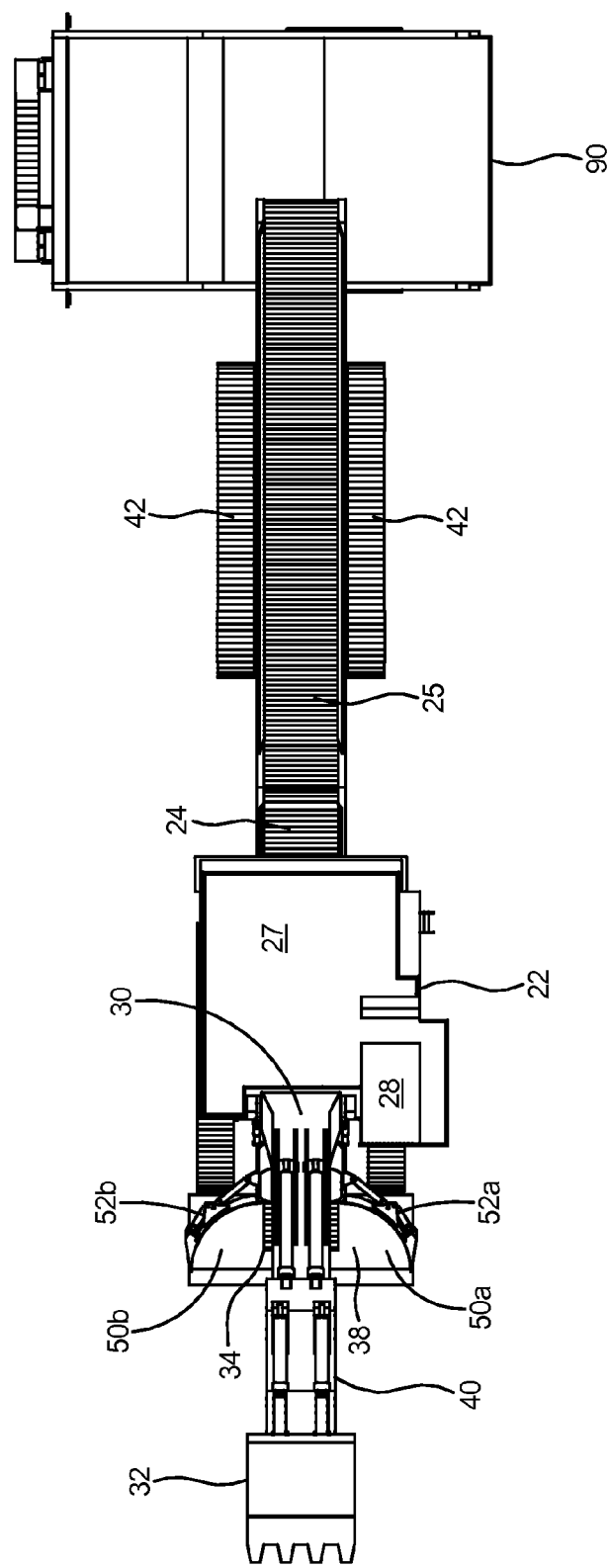
FIG. 3 is a top view of the excavating and loading apparatus.

As shown in FIG. 3, with boom 30 and stick 40 extended along the axial center of the excavator 22 the bucket 32 extends in front of the apron 32. The apron 38 includes a left side load receiving area 50a and right side load receiving area 50b that are each capable of receiving a load of material. The load receiving areas 50a and 50b are arranged on opposing sides of the intake end 34 of the feeder conveyor 24. Two double-hinged feeder blades including a left-hand feeder blade 52a and a right-hand feeder blade 52b are positioned at the rear 54 of the apron 38. The double hinged feeder blades 52a and 52b are arranged to operate asynchronously.

Figure 4:
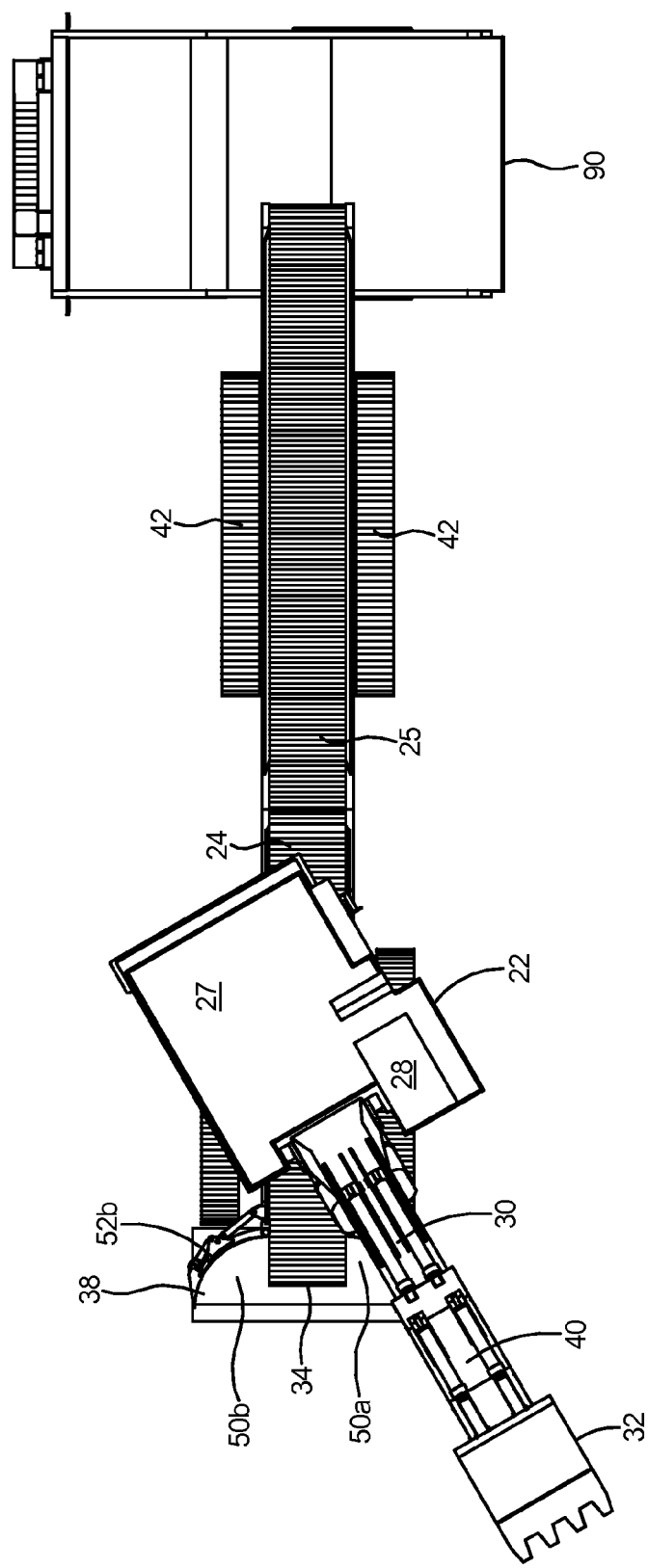
FIG. 4 is a top view of the excavating and loading apparatus with the control cabin rotated to load the left side of the apron.
Figure 5:
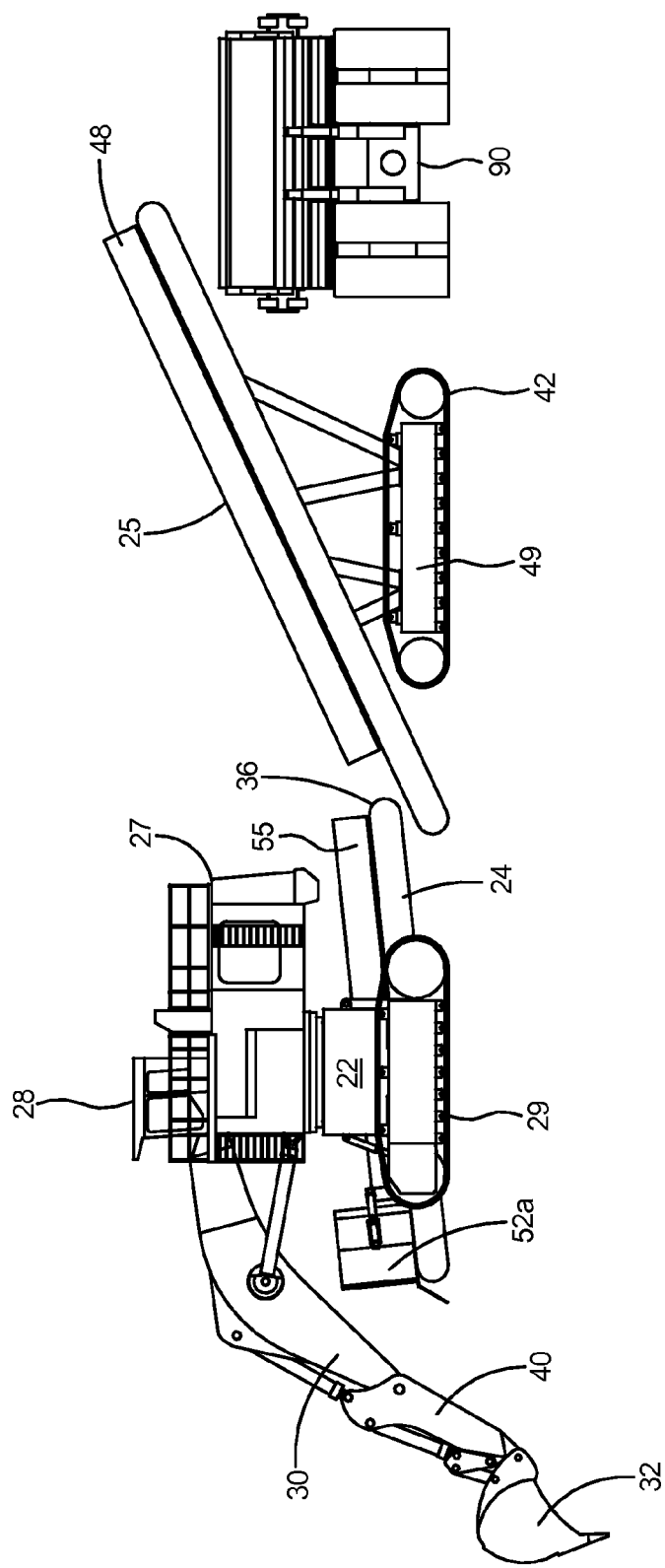
FIG. 5 is a side view of the excavating and loading apparatus with the boom and bucket directed downward to dig below grade.

With reference to FIG. 4, the upper stage 27 and articulated boom 30 are capable of being rotated by approximately 30° to each side. With the upper stage 27 rotated 30° to the left as shown and with left-hand feeder blade 52a open, or positioned at the rear 54 of the apron 38, the bucket 32 can be retracted in order to pull material onto the left side load receiving area 50a. Conversely, with the right-hand feeder blade 52b open, the upper stage 27 and articulated boom 30 can be rotated by approximately 30° to the right side in order to pull material onto the right side load receiving area 50b. As shown in FIG. 5, feeder conveyor 24 includes side walls 55 that contain material on the conveyor.

Figure 6:
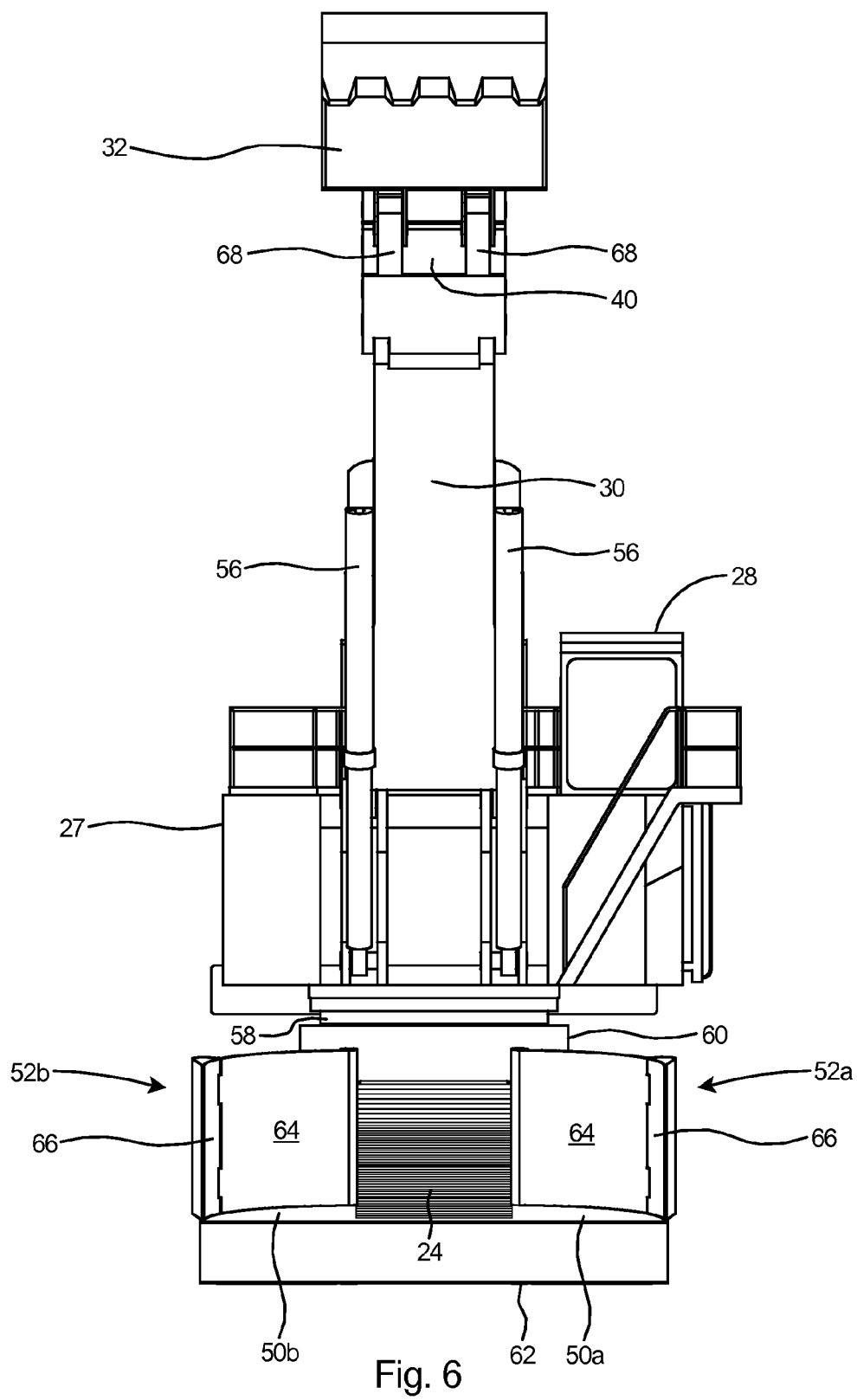
FIG. 6 is a front view of the excavating and loading apparatus with the boom and bucket raised.

Referring to FIG. 6, the angle of boom 30 can be changed by actuating paired boom cylinders 56, which are preferably hydraulic cylinders. A slewing bearing 58 connects the upper stage 27 to the lower frame 60 and enables the upper stage 27 and articulated boom 30 to rotate with respect to the lower frame. As shown apron 38 includes a front edge 62 that can be lowered to meet grade level at the excavation site. Double-hinged feeder blades including left-hand blade 52a and right-hand blade 52b each include a main blade 64 and a wing blade 66.

Figure 7:
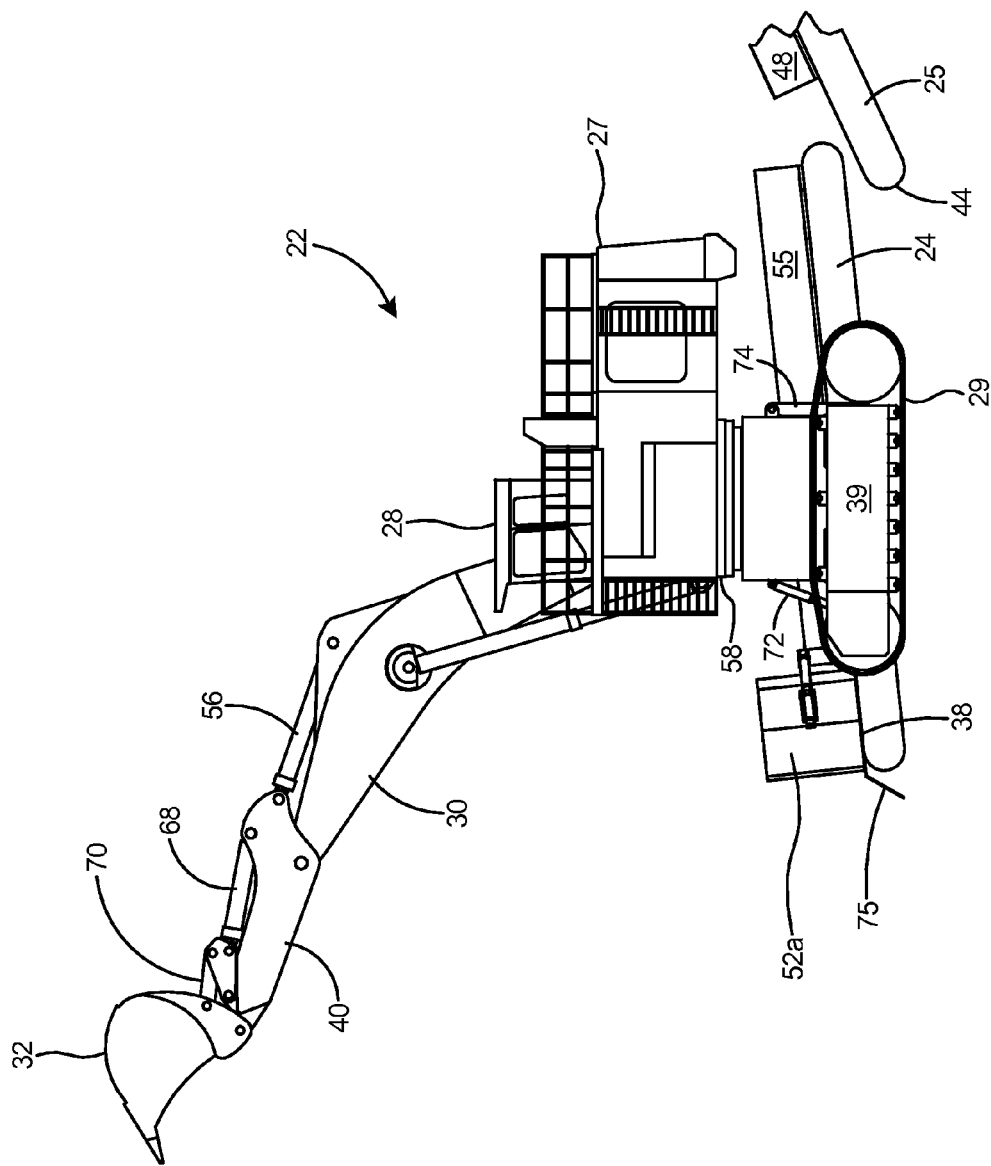
FIG. 7 is a side elevation view of the excavator portion of the excavating and loading apparatus of the present invention.

As shown in FIG. 7, articulated boom 30 further includes stick cylinders 68 to change the angle of stick 40 with respect to boom 30, and bucket cylinders 70 in order to change the angle of the bucket 32 with respect to the stick 40. Controls for actuating any of the cylinders are located in control station 28, and can be manipulated by the operator as required to pull material onto the apron 38. An apron cylinder 72 extends between the front of the lower frame 60 and apron 38 and enables the operator to raise and lower the apron 38 and the intake end 34 of the feeder conveyor 24. The apron 38 is typically lowered to ground level for loading material onto the apron and is typically raised in preparation for activating excavator crawler tracks 29 for moving the excavator 22 to a new location. The excavator 22 further includes a pin 74 extending between the rear of the lower frame 60 and the feeder conveyor 24. The pin 74 enables the discharge end 36 of the feeder conveyor 24 to pivot with respect to the lower frame 60. During loading operations of the excavator 22, the discharge end 36 of feeder conveyor 24 is pinned higher than the input end 44 of stacker conveyor 25. Apron 38 includes a nose portion 75 extending downward from its front edge.

Figure 8:
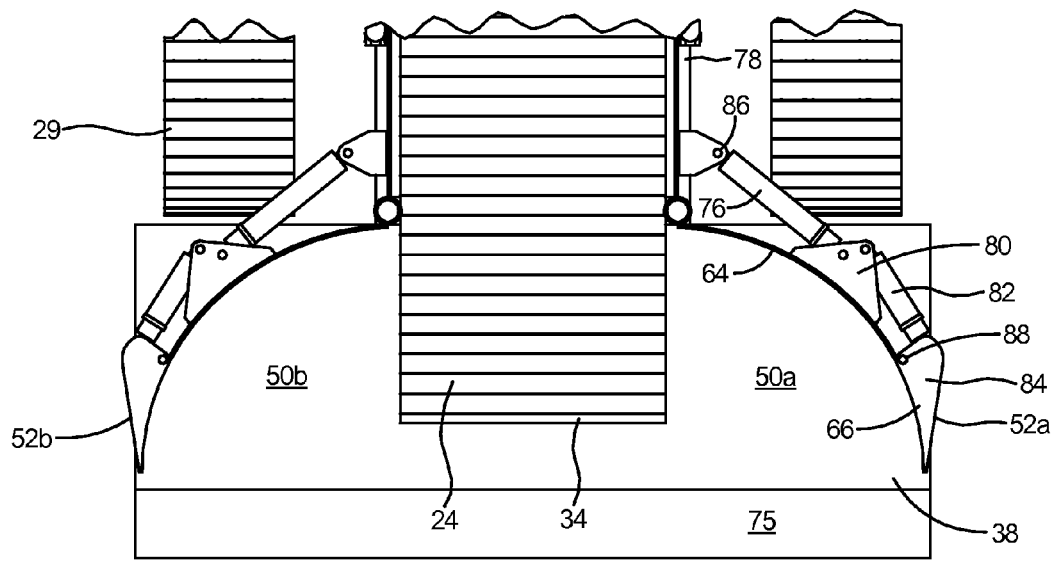
FIG. 8 is a top view of the apron portion of the excavating and loading apparatus depicting the double hinged feeder blades in the open position.

FIGS. 8-11 are top views of the apron 38 portion of the excavating and loading apparatus depicting the double-hinged feeder blades 52a and 52b in various positions during a typical loading operation. As shown in FIG. 8, initially the left-side hinged feeder blade 52a and the right-side hinged feeder blade 52b are in the open position, with the feeder blades positioned near the rear 54 of the apron 38. Left-side feeder blade 52a is positioned behind left side load receiving area 50a and right-side feeder blade 52b is positioned behind right side load receiving area 50b. Both the left and right side feeder blades include a main blade cylinder 76 connecting at one end to the feeder conveyor framework 78 and at its opposing end to a bracket 80 on the main blade 64. A wing blade cylinder 82 extends between bracket 80 and bracket 84 on the wing blade 66. Thus, via activation of main blade cylinder 76 and wing blade cylinder 82, main blade 64 can pivot around main pin 86 and wing blade 66 can pivot around wing pin 88. Thus FIG. 8 depicts the double-hinged feeder blades 52a and 52b in the open position.

Figure 9:
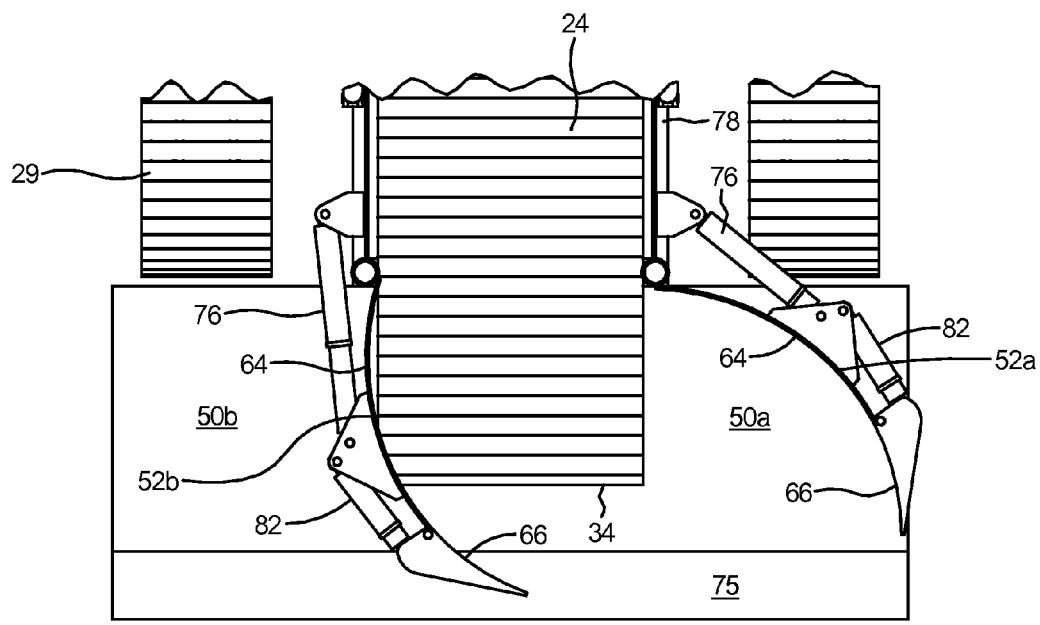
FIG. 9 is a top view of the apron area depicting the main blade of the right side double hinged feeder blade in its fully extended position and the wing blade open.

With reference to FIG. 9, after the excavator has loaded material onto the right side load receiving area 50b, main blade cylinder 76 is extended to push material from the right side load receiving area 50b onto the intake end 34 of the feeder conveyor 24. FIG. 9 depicts the main blade 64 closed and wing blade 66 open.

Figure 10:
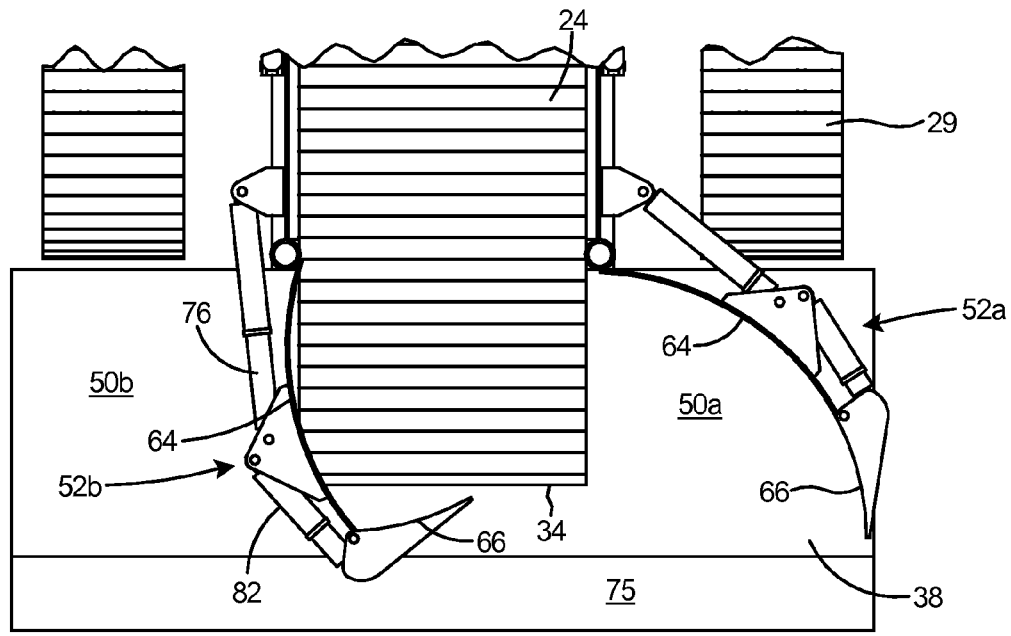
FIG. 10 is a top view of the apron area depicting the main blade of the right side double hinged feeder blade in its fully extended position and the wing blade closed.

Referring to FIG. 10, after the main blade 64 is closed, wing blade cylinder 82 is fully extended to fully close the wing blade 66 and thereby further push material from the apron 38 and the nose portion 75 portion of apron 38 onto the intake end 34 of the feeder conveyor 24. This effectively pushes all material from the right side load receiving area 50b onto the feeder conveyor 24.

Figure 11:
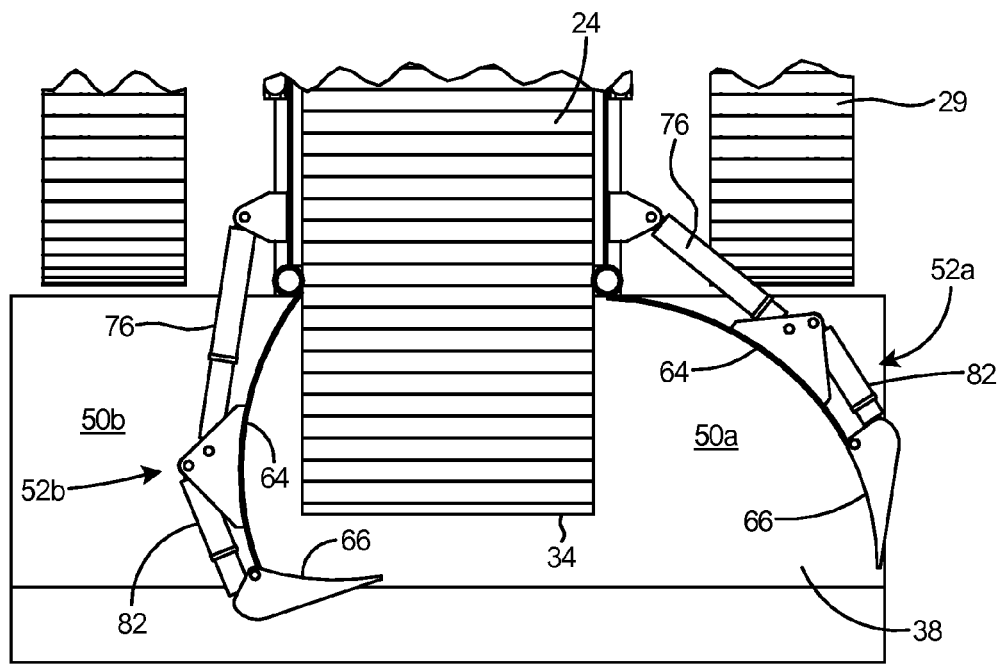
FIG. 11 is a top view of the apron area depicting the main blade of the right side double hinged feeder blade partially during its closing sequence with the main blade retracted from its fully extended position.

With reference to FIG. 11, after the material on the right side load receiving area 50b has been pushed onto the feeder conveyor 24, main blade cylinder 76 begins to retract and pulls the main blade 64 toward the open position. As main blade 64 is opening, wing blade 66 remains closed until main blade 64 is fully open. Wing blade cylinder 82 is then retracted to fully open the wing blade 66. After the material on right side load receiving area 50b has been forced onto the feeder conveyor 24, the right side wing blade 66 critically is kept closed while main blade 64 is opening. At the same time right-side hinged feeder blade 52b is sequencing from closed to open position, the left side load receiving area 50a becomes active and may be reloaded with material from the bucket (not shown). Thus the wing blade 66 is held closed on the feeder blade 52b that is in the process of opening in order to keep the load receiving area 50a on the opposing side open and ready to accept material. The double hinged feeder blades 52a and 52b are designed to operate asynchronously. The asynchronous operation is controlled by a microprocessor to ensure that one load receiving side of the apron 38 is open while the opposing load receiving side of the apron is closed.

As shown in FIG. 11, the feeder conveyor 24 extends a substantial distance into the apron 38. Thus, as either of the hinged feeder blades 52a and 52b is closed, material will quickly be transferred from the load receiving area onto the intake end 34 of the feeder conveyor 24. Operation of the excavating and loading apparatus is continuous as the hinged feeder blades 52a and 52b continue to open asynchronously and the operator pulls material onto the open side of the apron 38 as needed.

With reference to FIG. 1, in operation, the articulated boom 30 is extended onto the pile and is retracted to pull material onto a first side 50a or 50b of the apron 38. The double-hinged feeder blades 52a or 52b on the loaded side of the apron are then activated in the sequence described hereinabove to push material onto the feeder conveyor 24. After the active feeder blade is in its fully closed position, the bucket is used to pull material onto the opposing side of the apron. After the double-hinged feeder blade on the first side is returned to the open position, the double-hinged feeder blade on the opposing side is activated to push the material on that side of the apron 38 onto the feeder conveyor 24. The double-hinged feeder blades 52a and 52b continue to operate asynchronously as the operator continues to pull material to the empty side of the apron at the proper time during each cycle. The asynchronous cycling of the double hinged feeder blades 52a and 52b continues while the articulated boom 30 and bucket 32 are operated to alternatively load the open side of the apron 38. While the excavator 22 is continues to work to fill the apron 38, the feeder conveyor 24 and the stacker conveyor 25 run continuously to deliver the excavated material to the truck 90.

As the apron 38 is continually reloaded with material by the excavator 22, the inclined feeder conveyor 24 runs continuously and conveys material to the rear of the excavator and onto the stacker conveyor 25. The intake end 34 of the feeder conveyor 24 is positioned in the middle of the apron 38, thus, as each double hinged feeder blade 52a and 52b closes, the feeder conveyor 24 is reloaded with material. The stacker conveyor 25 receives material from the discharge end 36 of the feeder conveyor 24 and runs continuously to convey the material to its discharge end 46 whereupon the material falls into a waiting truck 90, similar haulage vehicle, or feeder-breaker to be crushed.

Figure 12:
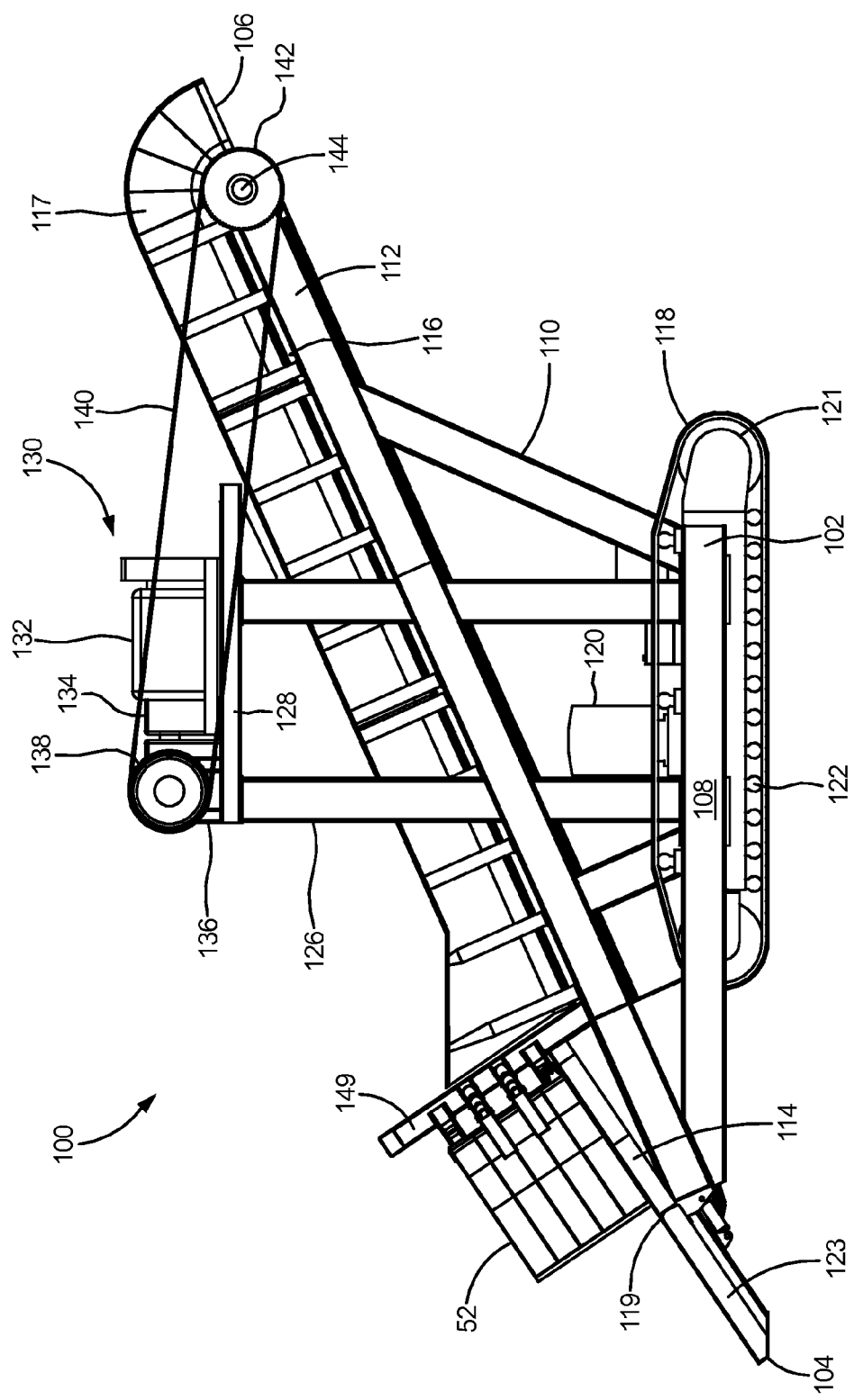
FIG. 12 is a side elevation view of a second and preferred embodiment of a stacker conveyor according to the present invention.

With reference to FIG. 12 there is shown a second and preferred embodiment of a stacker conveyor 100 according to the present invention. The stacker conveyor 100 is mounted on a crawler frame 102 and includes an intake end 104 and a discharge end 106. Crawler frame 102 includes a lower frame member 108 and arms 110 that support an upper frame member 112. Frame 102 supports an apron 114 and an inclined conveyor 116. Side walls 117 extend along either side of the conveyor 116 and act to contain material on the conveyor. The crawler frame 102 supports paired crawler tracks 118 and a crawler drive assembly 120 for driving the crawler tracks. Crawler drive assembly 120 provides power to a drive roller 121 to power the parallel crawler tracks 118 around a plurality of idler rollers 122 for driving the paired crawler tracks.

Apron 114 includes a front edge 119 and a nose portion or ramp 123 extending downward from the front edge. Two double-hinged feeder blades 52 are positioned on opposing sides of the apron 114. Support beams 126 extend upward from the upper frame member 112 and support a drive platform 128. Drive platform 128 includes an upper drive assembly 130 for driving the conveyor 116. Upper drive assembly 130 includes an engine 132, a torque converter 134, two driver axles 135 (see FIG. 15), and two planetary gearboxes 136 with planetary sprockets 138. A chain 140 extends between each planetary gearbox 136 and engages head shaft sprockets 142 on main head shaft 144 which drives the conveyor 116.

Figure 13:
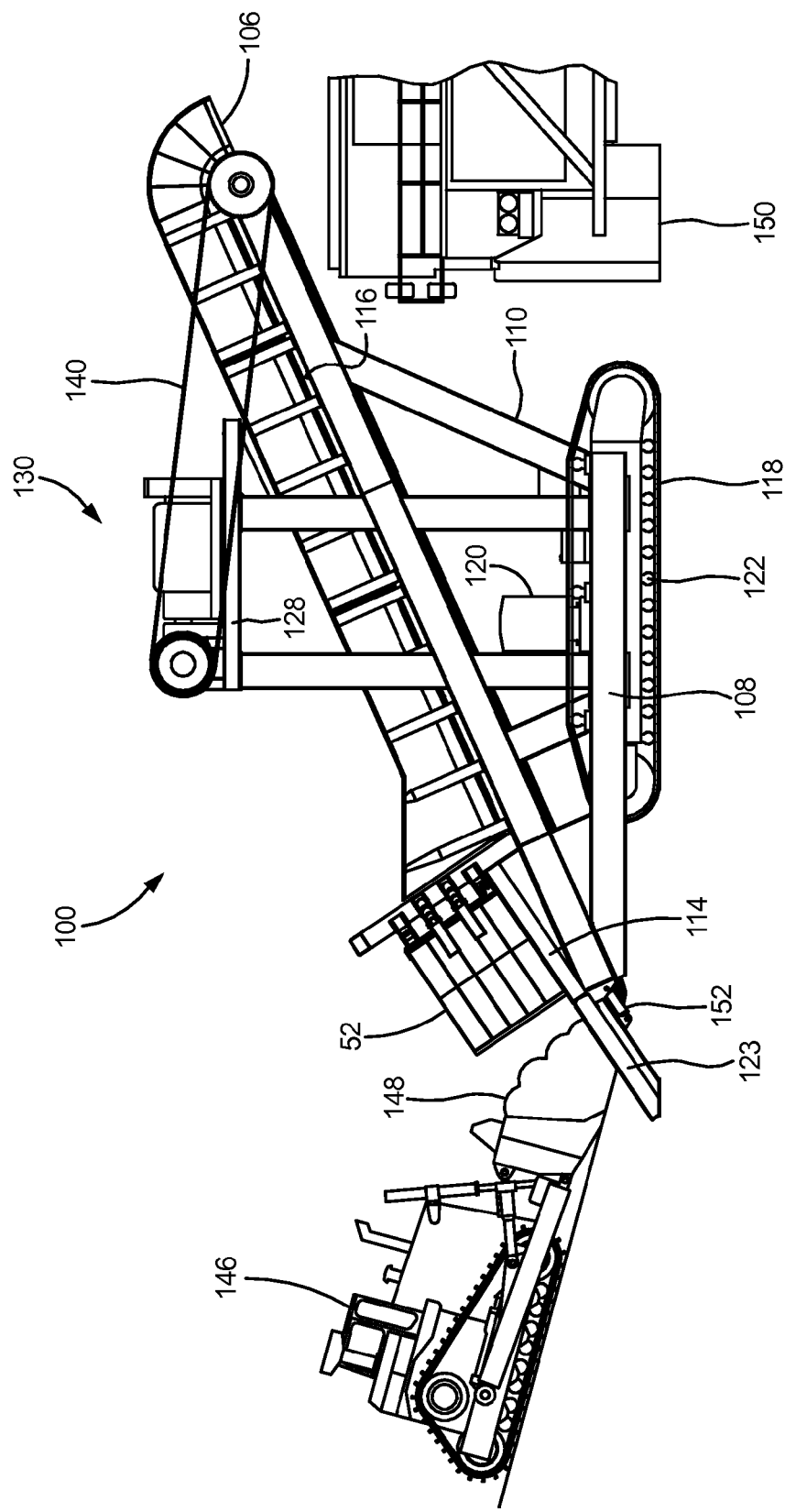
FIG. 13 is a side elevation view of the high volume feeding and loading method of the present invention including the stacker conveyor of FIG. 12, a dozer feeding material to the stacker conveyor, and a vehicle receiving material from the loading apparatus.

Referring to FIG. 13, an earth mover, such as a bull dozer 146, is used to push ore or similar material 148 onto the apron 114 of the stacker conveyor 100. Double-hinged feeder blades 52, extending from a support plate 149 that is secured to upper frame member 112, operate asynchronously to feed material from one side of the apron 114 onto the conveyor 116 and then to feed material from the opposing side of the apron onto the conveyor. The feeder blades 52 cycle continuously and the conveyor 116 runs continuously to alternately clear material from each side of the apron 114 and advance the material onto the moving conveyor. The conveyor 116 runs continuously and delivers the loaded material to the discharge end 106 which delivers the material to a waiting truck 150, similar haulage vehicle, or feeder-breaker to be crushed and fed onto an overland conveyor. A pile of material 148 may be formed by the dozer 146 enabling the stacker conveyor 100, by directed operation of the crawler tracks 118, to be driven into the pile to load the apron 114. Ramp 123 includes one or more ramp hydraulic cylinders 152, which can be operated to lower the ramp to the ground level, thereby enabling forward movement of the stacker conveyor 100 to scoop material onto the ramp 123 and thence onto the apron 114. Ramp hydraulic cylinders 152 can reversed to raise the ramp 123, such as when driving the stacker conveyor 100 from one location to another such as moving to another location to be mined.

Figure 14:
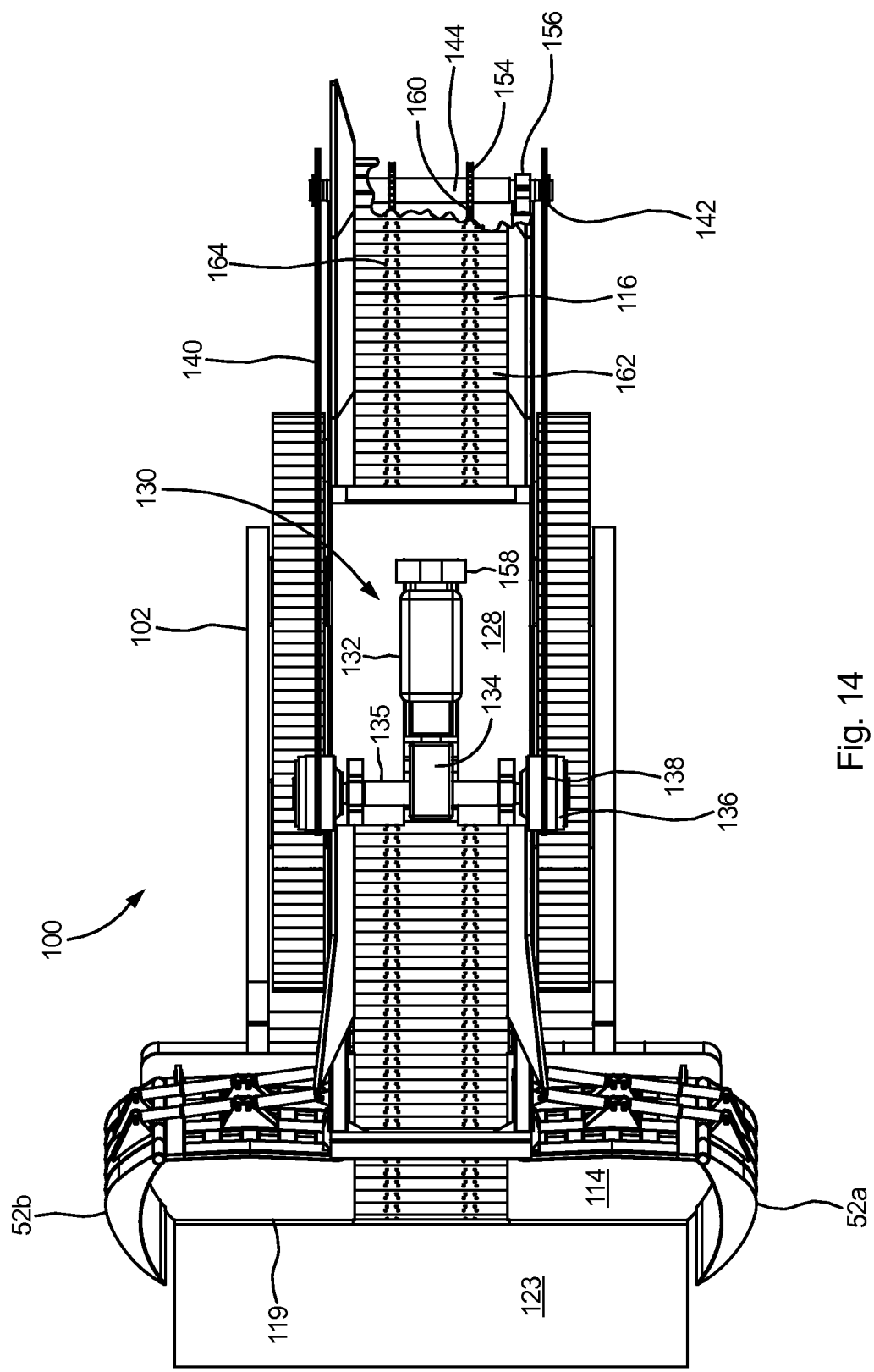
FIG. 14 is a top view of the stacker conveyor of FIG. 12.
Figure 15:
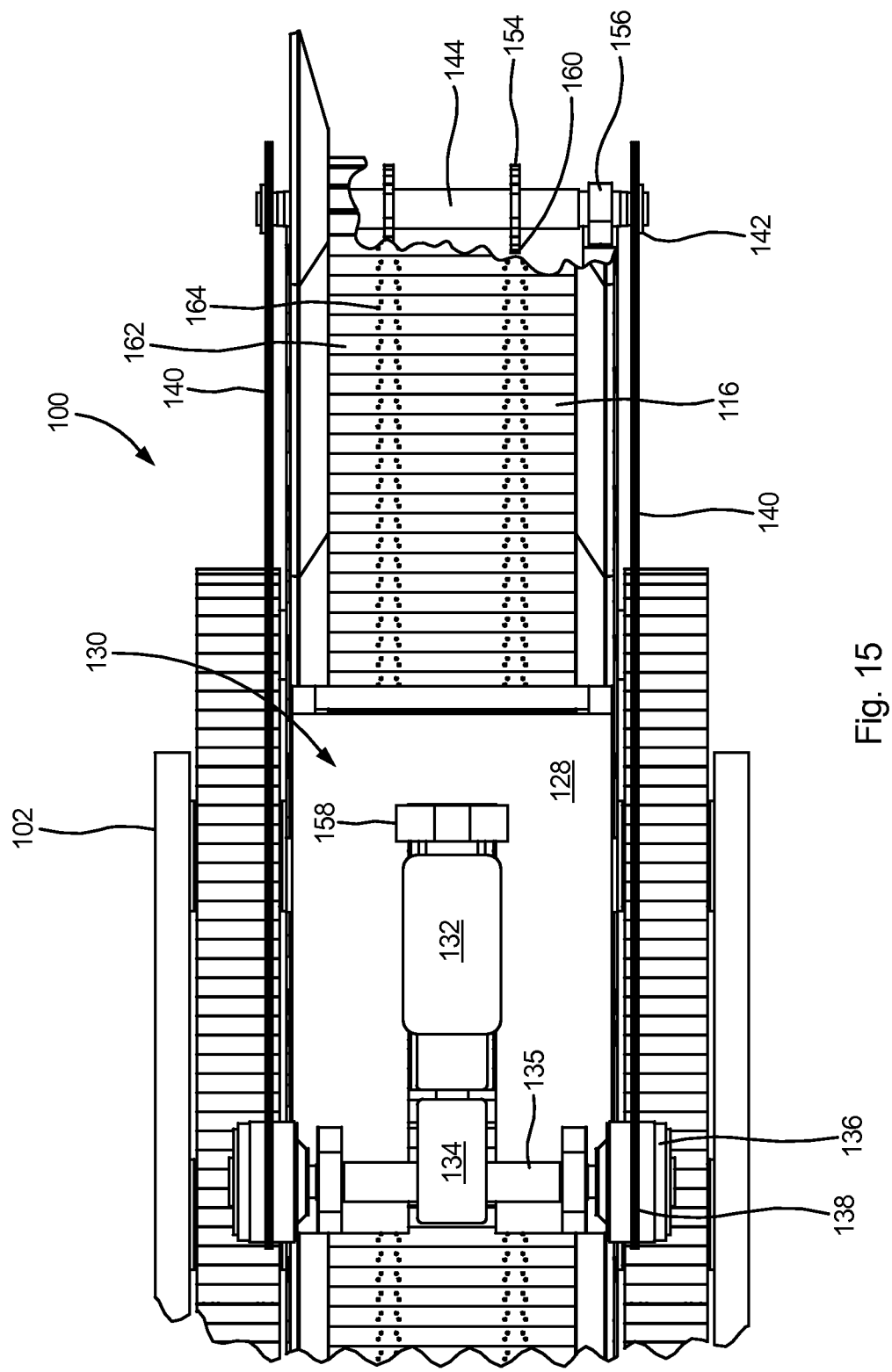
FIG. 15 is a plan view of the upper drive apparatus of the stacker conveyor.

With reference to FIGS. 14 and 15, the drive platform 128 is mounted to the frame 102 over the conveyor 116. The conveyor is powered by the upper drive assembly 130 including an engine 132, a torque converter 134, and two planetary gearboxes 136 with planetary sprockets 138. A chain 140 extends between each planetary gearbox 136 and engages head shaft sprockets 142 on main head shaft 144 which rotates the conveyor sprockets 154 which in turn drives the conveyor 116. Pillow blocks 156 constrain rotation of the main head shaft 144. A radiator 158 is mounted to the engine 132 to provide engine cooling. Conveyor sprockets 154 drive conveyor chains 160. Conveyor 116 is preferably a flighted conveyor with flights 162 that are secured by bolts 164 to the conveyor chains 160.

The upper drive assembly 130 for driving the main drive shaft will provide up to 300,000 foot-pounds of start-up torque. Conventional conveyor drives typically use either diesel/electric driving a mechanical gear reduction gear box to drive a main shaft or hydraulic planetary gear-boxes. Although hydraulic planetary gearboxes can be used to drive the conveyor, they are substantially more expensive than the straight mechanical drive unit 130 of the present invention. The stacker conveyor 100 of the present invention is driven by the main head shaft 144 with a bull-dozer, straight mechanical drive unit—using gear reduction in transmission and planetary gear drives to generate the torque required. This reduces the power requirement and improves the efficiency dramatically over conventional conveyor drives as the hydraulic motors, pumps, and radial piston gear-boxes commonly used for this application require almost twice the horsepower to generate the same start-up torque. The straight mechanical drive unit of the present invention also eliminates the use of clutches, which are used for starting and stopping conventional diesel/electric drives. The clutches wear quickly and require a substantially more maintenance issues). The straight mechanical drive unit of the present invention further eliminates the need for sophisticated "soft start" electronics. As shown in FIG. 14, the conveyor 116 extends to the front edge 119 of the apron 114.

FIGS. 16-20 are top views of the apron 114 portion of the stacker conveyor depicting the double-hinged feeder blades, including the left side feeder blade 52a and right side feeder blade 52b, in various positions during a typical loading operation. The double-hinged feeder blades operate substantially in the same manner as the double-hinged feeder blades of the first embodiment, as described hereinabove. The double-hinged feeder blades 52a and 52b however are positioned farther toward the rear edge 166 of the apron 114, thereby providing a larger right side load receiving area 50b and larger left side load receiving area 50a. Left-side feeder blade 52a is positioned behind left side load receiving area 50a and right-side feeder blade 52b is positioned behind right side load receiving area 50b. Both the left and right side feeder blades include a main blade cylinder 76 connecting at one end to the support plate 149 and at its opposing end to a bracket 80 on the main blade 64. A wing blade cylinder 82 extends between bracket 80 and bracket 84 on the wing blade 66. Thus, via activation of main blade cylinder 76 and wing blade cylinder 82, main blade 64 can pivot around main pin 86 and wing blade 66 can pivot around wing pin 88.

Figure 16:
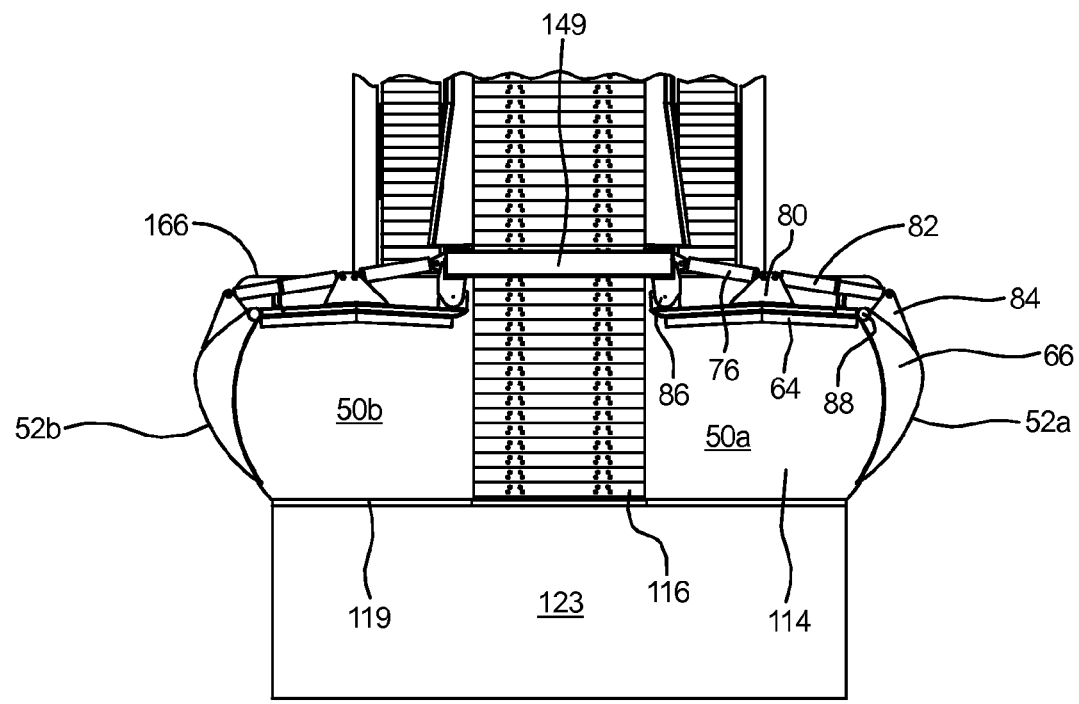
FIG. 16 is a plan view of the apron and blade feeder portion of the loading apparatus with both blades fully retracted.
Figure 17:
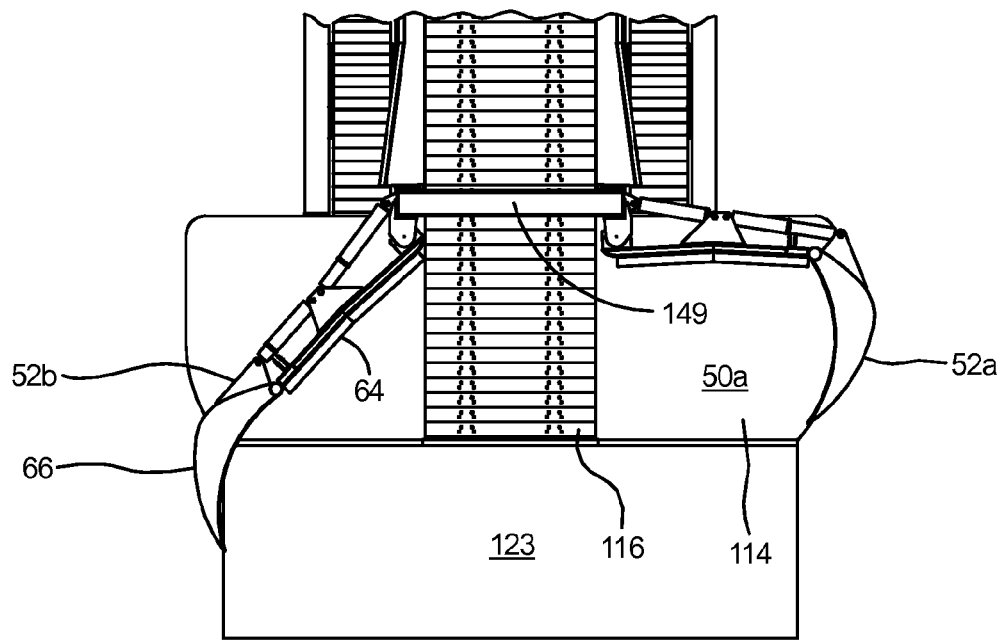
FIG. 17 is a plan view of the apron and blade feeder portion of the loading apparatus with the right blade partially closed.
Figure 18:
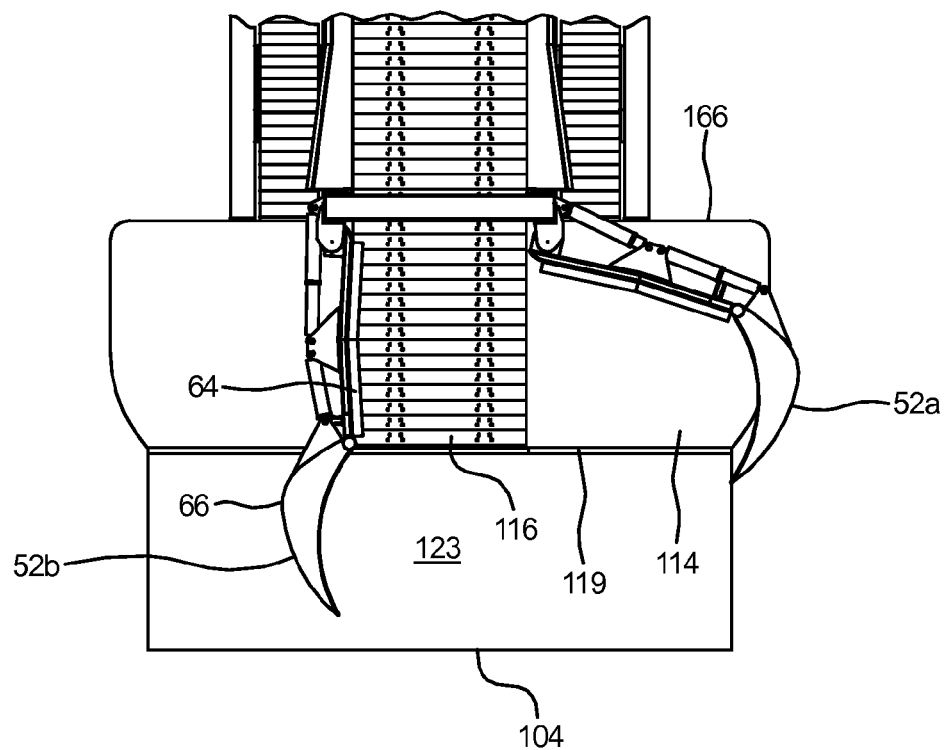
FIG. 18 is a plan view of the apron and blade feeder portion of the loading apparatus with the right blade fully extended.
Figure 19:
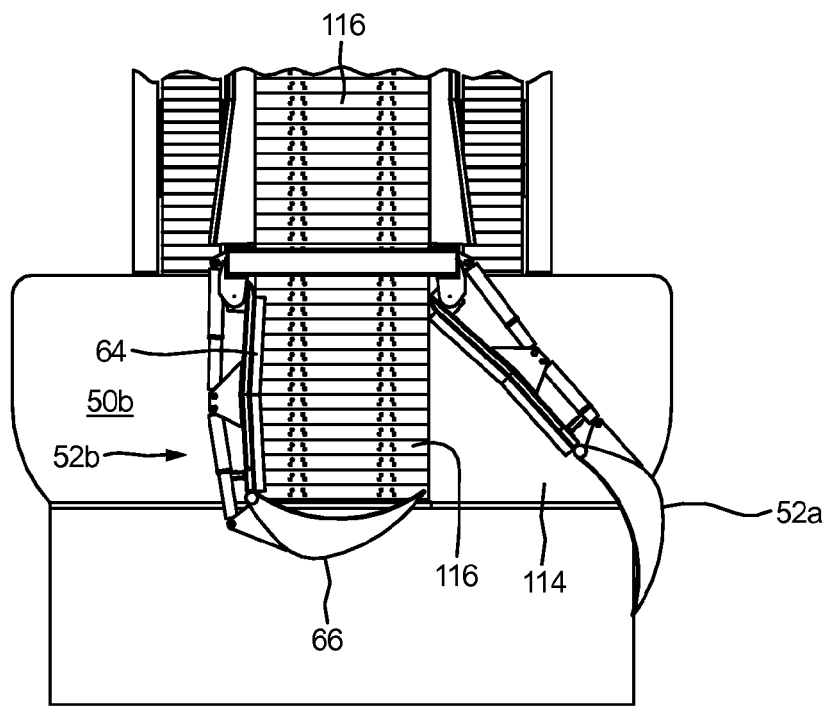
FIG. 19 is a plan view of the apron and blade feeder portion of the loading apparatus with the right blade fully closed.

Thus FIG. 16 depicts the double-hinged feeder blades 52a and 52b in the open position. FIGS. 16 through 19 depict the sequence of the right side feeder blade 52b going through its progression in order to feed material from the right side load receiving area 50b of the apron 114 to the conveyor 116. As shown in FIG. 16, main blade 64 is substantially parallel with the rear edge 166 of the apron 114 and wing blade 66 is approximately orthogonal to the main blade 64. As the right side feeder blade 52b progresses, as shown in FIG. 17, the wing blade 66 has swung substantially parallel to the main blade 64. At further progression of the right side feeder blade 52b, as shown in FIG. 18, the main blade 64 and wing blade 66 are extended near intake end 104 of ramp 123. Finally, as shown in FIG. 19, the wing blade 66 swings to the closed position, or approximately perpendicular to the main blade 64, which completes the closing cycle of the right side feeder blade 52b thereby moving all material from the right side load receiving area 50b onto the conveyor 116. As shown by the sequence in FIGS. 17-19, the feeder blade 52b describes a wide arc when sweeping closed and thereby advances material from a major portion of the apron 114 to the conveyor 116. As shown in FIG. 19, at the completion of the closing cycle of the right side feeder blade 52b, left side feeder blade 52a has begun its closing cycle. The feeder blades 52a and 52b continue to cycle substantially asynchronously as the apron 114 is refilled with material from a dozer or similar earth moving apparatus.

Figure 20:
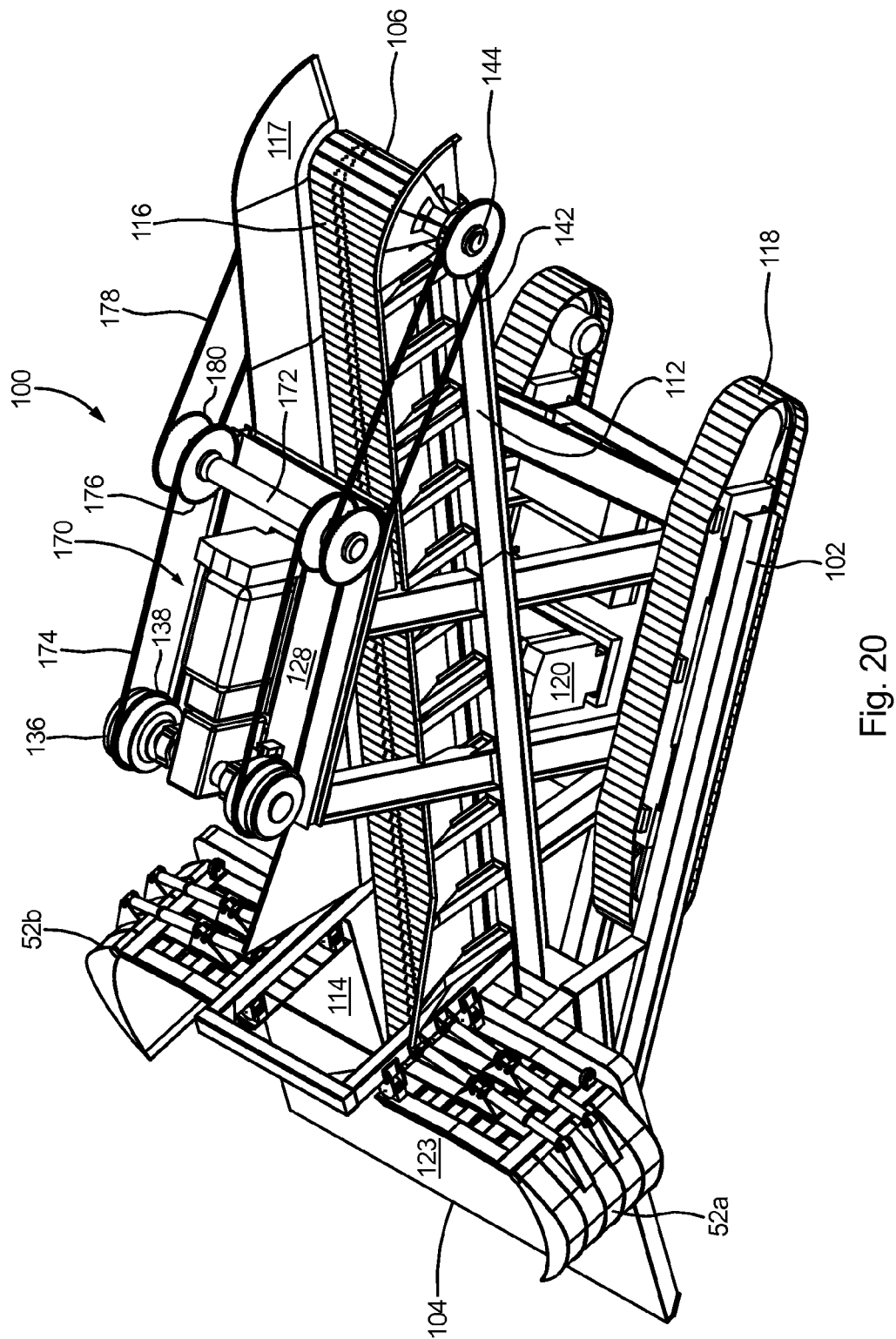
FIG. 20 is an isometric view of the second and preferred embodiment of the stacker conveyor according to the present invention.

As shown in FIG. 20, the stacker conveyor 100 includes an intake end 104 and a discharge end 106. Crawler frame 102, including upper frame member 112, supports the apron 114 and the conveyor 116. Side walls 117 extend along either side of the conveyor 116 to contain material on the conveyor. Crawler drive assembly 120 provides power means for driving the parallel crawler tracks 118 around a plurality of idler rollers 122 (see FIG. 13) for guiding the crawler tracks. Preferably, crawler drive assembly 120 includes one 500 horsepower engine for driving hydraulic gearboxes for powering the crawler tracks 118 driving the double-hinged feeder blades 52a and 52b. Crawler frame 102 includes drive platform 128 which supports the upper drive assembly 130 for driving the conveyor 116. Preferably, the upper drive assembly 130 is a dozer drive train, such as model D9, D10, or D11, which are available from Caterpillar, Inc., of Peoria, Ill.

Preferably, the conveyor 116 is 9-feet wide, will load to a depth of 3.5-feet, and will run at a speed of 200 feet/minute. Assuming 1 cubic yard of material will weigh 3,200 pounds, the conveyor is capable of loading about 23,700 tons per hour. Using a D11 dozer engine to drive the upper drive assembly 130, the conveyor will have 300,000 pounds of startup torque and 200,000 pounds of running torque.

The stacker conveyor 100 in FIG. 20 includes a second embodiment of an upper drive assembly 170. Upper drive assembly 170 uses a standard bulldozer drive train, which will include a given track gauge that is center to center of the drive sprockets on the two planetary gearboxes 136. Drive assembly 170 includes an extra drive shaft 172 mounted on the front of the drive platform 128. Drive shaft 172 will match up with the standard track gauge of the standard bulldozer drive train and also enable it to match up with the track gauge on the main head shaft 144 and to thus drive the head shaft sprockets 142 mounted outward of the conveyor sidewalls 117 and the upper frame member 112. In this embodiment of the upper drive assembly 170, a first chain 174 extends between each planetary gearbox 136 and engages inner sprockets 176 on the extra drive shaft 172. A second chain 178 engages outer sprockets 180 on the extra drive shaft 172 and engages head shaft sprockets 142 on main head shaft 144 to drive the conveyor 116.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A loading and stacking apparatus comprising:
   a crawler frame including paired crawler tracks;
   an inclined conveyor supported by said crawler frame, said inclined conveyor including an intake end and a discharge end;
   a drive assembly for driving said conveyor;
   an apron at said intake end of said conveyor;
   two double-hinged feeder blades at the rear of said apron;
   power and control means for running said crawler tracks and said double-hinged feeder blades;
   a main blade pivotably connected at one end to said feed conveyor framework and driven by a main blade hydraulic cylinder;
   a wing blade pivotably connected at the opposing end of said main blade and driven by a wing blade hydraulic cylinder; and
   an actuator for each of said main blade and wing blade hydraulic cylinders enabling the main and wing portions of the double-hinged feeder blades to be operated asynchronously and independently.

2. The loading and stacking apparatus of claim 1 including
   a main pin for enabling said pivotable connection of said main blade to said feeder conveyor framework;
   a wing pin for enabling said pivotable connection of said wing blade to said main blade; and
   a wing blade cylinder extending between said main blade and said wing blade.

3. The loading and stacking apparatus of claim 1 including
   a ramp extending downward from said apron; and
   a ramp hydraulic cylinder for lowering said ramp to a ground level.

4. The loading and stacking apparatus of claim 1 wherein said apron includes
   a left side load receiving area and a right side load receiving area;
   said double-hinged feeder blades include a left-hand feeder blade and a right-hand feeder blade; and
   said left-hand feeder blade is positioned to push material from said left side load receiving area onto said feeder conveyor and said right-hand feeder blade is positioned to push material from said right side load receiving area onto said feeder conveyor.

5. The loading and stacking apparatus of claim 1 wherein said drive assembly is mounted to said crawler frame.

6. The loading and stacking apparatus of claim 1 wherein said drive assembly is a straight mechanical drive unit.

7. The loading and stacking apparatus of claim 1 wherein said drive assembly includes
an engine; and
a torque converter.

8. The loading and stacking apparatus of claim 7 wherein said drive assembly includes
a drive axle extending from said torque converter; and
a planetary gearbox including a planetary sprocket.

9. The loading and stacking apparatus of claim 1 wherein said main blade includes an arcuate face; and
said wing blade includes an arcuate face.

10. The loading and stacking apparatus of claim 1 including side walls on said stacker conveyor.

11. The loading and stacking apparatus of claim 1 including a bulldozer for pushing material onto said apron.

12. A loading and stacking apparatus comprising:
a crawler frame including paired crawler tracks;
an inclined conveyor supported by said crawler frame, said inclined conveyor including an intake end and a discharge end;
a drive assembly for driving said conveyor;
an apron at said intake end of said conveyor;
two double-hinged feeder blades at the rear of said apron;
power and control means for running said crawler tracks and said double-hinged feeder blades;
said drive assembly including a head shaft and a head shaft sprocket;
a chain extending around said planetary sprocket and said head shaft sprocket;
said head shaft driven by a straight mechanical drive unit including gear reduction in transmission and planetary gear drives to generate torque for driving the paired crawler tracks and the inclined conveyor.

13. A method of loading and stacking earthen material including
providing a stacker conveyor including an apron, a dozer for pushing material to said apron, an inclined conveyor including an intake end for receiving material from said apron and a discharge end for discharging material from said conveyor, and power and control means for running said stacker conveyor;
providing two load receiving areas on said apron;
providing two double-hinged feeder blades on said apron;
pushing material onto said apron with said dozer;
operating said double-hinged feeder blades asynchronously to push material in sequence from each of said load receiving areas onto said intake end of said conveyor;
continuously running said conveyor to convey material to said discharge end; and
continuously discharging material from said discharge end of said conveyor into a haulage vehicle.

14. The method of loading and stacking earthen material of claim 13 including
providing a means of driving said conveyor; and
said means of driving said conveyor including an upper drive assembly having an engine, a torque converter, a driver axles, and a planetary gearbox with planetary sprockets.

15. The method of loading and stacking earthen material of claim 14 wherein said means of driving said conveyor includes providing a head shaft on said conveyor having a head shaft sprocket.

16. The method of loading and stacking earthen material of claim 15 wherein said means of driving said conveyor includes providing a chain extending between said planetary gearbox and engages said head shaft sprocket.

17. The method of loading and stacking earthen material of claim 13 wherein said double-hinged feeder blades include
a main blade pivotably connected at one end to said feeder conveyor; and
a wing blade pivotably connected at the opposing end of said main blade.

* * * * *